United States Patent
Pan et al.

(10) Patent No.: US 11,426,711 B2
(45) Date of Patent: Aug. 30, 2022

(54) METHOD OF MAKING HIGHLY ACTIVE METAL OXIDE AND METAL SULFIDE MATERIALS

(71) Applicant: UOP LLC, Des Plaines, IL (US)

(72) Inventors: Wei Pan, Hoffman Estates, IL (US); Zara Osman, Glenview, IL (US); Jaime G. Moscoso, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 583 days.

(21) Appl. No.: 16/420,066

(22) Filed: May 22, 2019

(65) Prior Publication Data
US 2020/0368729 A1    Nov. 26, 2020

(51) Int. Cl.
| | |
|---|---|
| *B01J 27/051* | (2006.01) |
| *B01J 37/00* | (2006.01) |
| *B01J 37/04* | (2006.01) |
| *B01J 37/20* | (2006.01) |
| *C01G 53/00* | (2006.01) |
| *C07B 35/02* | (2006.01) |

(52) U.S. Cl.
CPC ....... *B01J 27/0515* (2013.01); *B01J 37/0018* (2013.01); *B01J 37/04* (2013.01); *B01J 37/20* (2013.01); *C01G 53/006* (2013.01); *C01G 53/40* (2013.01); *C07B 35/02* (2013.01); *C01P 2002/72* (2013.01); *C01P 2002/74* (2013.01)

(58) Field of Classification Search
CPC .... B01J 27/0515; B01J 37/0018; B01J 37/04; B01J 37/20; C01G 53/006; C01G 53/40; C07B 35/02
See application file for complete search history.

(56) References Cited

U.S. PATENT DOCUMENTS

| | | | |
|---|---|---|---|
| 4,820,677 | A | 4/1989 | Jacobson et al. |
| 4,904,634 | A | 2/1990 | Wieserman et al. |
| 5,278,121 | A | 1/1994 | Singhal et al. |
| 6,156,695 | A | 12/2000 | Soled et al. |
| 6,162,350 | A | 12/2000 | Soled et al. |

(Continued)

FOREIGN PATENT DOCUMENTS

| | | |
|---|---|---|
| CA | 2719157 A1 | 10/2009 |
| CA | 2620656 C | 3/2014 |

(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

(Continued)

*Primary Examiner* — James A Fiorito
(74) *Attorney, Agent, or Firm* — Paschall & Associates, LLC; James C. Paschall

(57) ABSTRACT

A method of making highly an active mixed transition metal oxide material has been developed. The method may include sulfiding the metal oxide material to generate metal sulfides which are used as catalyst in a conversion process such as hydroprocessing. The hydroprocessing may include hydrodenitrification, hydrodesulfurization, hydrodemetallation, hydrodesilication, hydrodearomatization, hydroisomerization, hydrotreating, hydrofining, and hydrocracking.

13 Claims, 2 Drawing Sheets

(56) References Cited

U.S. PATENT DOCUMENTS

| | | |
|---|---|---|
| 6,197,273 B1 | 3/2001 | Nagano et al. |
| 6,280,610 B1 | 8/2001 | Uragami et al. |
| 6,299,760 B1 | 10/2001 | Soled et al. |
| 6,534,437 B2 | 3/2003 | Eijsbouts et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,232,515 B1 | 6/2007 | Demmin et al. |
| 7,232,934 B2 | 6/2007 | Saleh et al. |
| 7,288,182 B1 | 10/2007 | Soled et al. |
| 7,513,989 B1 | 4/2009 | Soled et al. |
| 7,538,066 B2 | 5/2009 | Soled et al. |
| 7,544,632 B2 | 6/2009 | Soled et al. |
| 7,591,942 B2 | 9/2009 | Soled et al. |
| 7,605,107 B2 | 10/2009 | Soled et al. |
| 7,608,558 B2 | 10/2009 | Eijsbouts et al. |
| 7,648,941 B2 | 1/2010 | Soled et al. |
| 7,686,943 B2 | 3/2010 | Soled et al. |
| 7,691,257 B2 | 4/2010 | Shih et al. |
| 7,709,412 B2 | 5/2010 | Shih et al. |
| 7,749,937 B2 | 7/2010 | Domokos et al. |
| 7,776,205 B2 | 8/2010 | Soled et al. |
| 7,780,845 B2 | 8/2010 | Soled et al. |
| 7,951,746 B2 | 5/2011 | Bai et al. |
| 8,062,508 B2 | 11/2011 | Soled et al. |
| 8,067,331 B2 | 11/2011 | Eijsbouts-Spickova et al. |
| 8,080,492 B2 | 12/2011 | Kuperman et al. |
| 8,173,570 B2 | 5/2012 | Maesen et al. |
| 8,206,575 B2 | 6/2012 | Maesen et al. |
| 8,216,958 B2 | 7/2012 | Wu et al. |
| 8,318,628 B2 | 11/2012 | Brun et al. |
| 8,343,887 B2 | 1/2013 | Maesen et al. |
| 8,377,289 B2 | 2/2013 | Li et al. |
| 8,383,543 B2 | 2/2013 | Maesen et al. |
| 8,586,500 B2 | 11/2013 | Kuperman et al. |
| 8,636,967 B2 | 1/2014 | Caneion et al. |
| 8,846,560 B2 | 9/2014 | Yang et al. |
| 2008/0280754 A1 | 11/2008 | Toledo Antonio et al. |
| 2009/0114566 A1 | 5/2009 | Chen et al. |
| 2012/0065056 A1 | 3/2012 | Domokos et al. |
| 2012/0122653 A1 | 5/2012 | Maesen et al. |
| 2012/0122659 A1 | 5/2012 | Kuperman et al. |
| 2012/0172199 A1 | 7/2012 | Yang et al. |
| 2013/0068662 A1 | 3/2013 | Maesen et al. |
| 2013/0337996 A1 | 12/2013 | Eijsbouts-Spickova et al. |
| 2014/0027350 A1 | 1/2014 | Soled et al. |
| 2015/0292095 A1 | 10/2015 | Haber et al. |
| 2017/0165644 A1 | 6/2017 | Miller et al. |
| 2017/0165645 A1 | 6/2017 | Miller et al. |
| 2017/0165646 A1 | 6/2017 | Miller et al. |
| 2017/0165647 A1 | 6/2017 | Miller et al. |
| 2017/0165648 A1 | 6/2017 | Miller et al. |
| 2017/0165649 A1 | 6/2017 | Miller et al. |
| 2017/0165650 A1 | 6/2017 | Miller et al. |
| 2017/0165651 A1 | 6/2017 | Miller et al. |
| 2017/0165652 A1 | 6/2017 | Miller et al. |
| 2017/0165656 A1 | 6/2017 | Miller et al. |
| 2017/0166605 A1 | 6/2017 | Miller et al. |
| 2017/0218528 A1 | 8/2017 | Zhang et al. |
| 2018/0169633 A1 | 6/2018 | Millet et al. |
| 2019/0060873 A1 | 2/2019 | Millet et al. |
| 2019/0060882 A1 | 2/2019 | Miller et al. |

FOREIGN PATENT DOCUMENTS

| | | |
|---|---|---|
| CN | 102049265 A | 5/2011 |
| CN | 101306374 B | 1/2012 |
| EP | 2103347 A1 | 9/2009 |
| RU | 2098181 C1 | 12/1997 |
| WO | 200042126 A1 | 7/2000 |
| WO | 2009061295 A1 | 5/2009 |
| WO | 2014033653 A2 | 3/2014 |

OTHER PUBLICATIONS

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study Of Mo (Or W)—Co, Mo (Or W)—Ni, And Mo (Or W)—Ca Sulfided Phases", J. CataL, v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chern. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in hydrodesulfurization", Neftekhimiya, v 46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher: Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/81872-5813(13)60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon". Electrochemistry Communications 34 (2013) 323-326.

(56) References Cited

OTHER PUBLICATIONS

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

U.S. Appl. No. 16/189,057 Crystalline Oxy-Hydroxide Transition Metal Molybdotungstate, Millet et al. filed Nov. 30, 2018.

U.S. Appl. No. 16/189,501 Mixed Transition Metal Tungstate, Millet et al. filed Nov. 13, 2018.

U.S. Appl. No. 16/206,837 Highly Active Quaternary Metallic Materials Using Short-Chain Alkyl Quaternary Ammonium Compounds, Osman et al. filed Nov. 30, 2018.

U.S. Appl. No. 16/206,924 Chighly Active Quaternary Metallic Materials Using Short-Chain Alkyl Quaternary Ammonium Compounds, Osman et al. filed Nov. 30, 2018

U.S. Appl. No. 16/198,613 Highly Active Trimetallic Materials Using Short-Chain Alkyl Ouaternary Ammonium Compounds, Pan et al. filed Nov. 21, 2018.

U.S. Appl. No. 16/206,804 Highly Active Trimetallic Materials Using Short-Chain Alkyl Ouaternary Ammonium Compounds, Osman et al. filed Nov. 30, 2018.

U.S. Appl. No. 16/206,898 Highly Active Multimetallic Materials Using Short-Chain Alkyl Ouaternary Ammonium Compounds, Osman et al. filed Nov. 30, 2018.

Luttrell et al., Why is anatase a better photocatalyst than rutile?—Model studies on epitaxial TiO2 films, Scientific Reports, 4 :4043 | DOI: 10 1038/srep04043, Feb. 10, 2014.

Challagulla et al., Structure sensitive photocatalytic reduction of nitroarenes over TiO2, Scientific Reports, 7: 8783 DOI: 10.1038/s41598-017-08599-2, Aug. 18, 2017.

METHOD OF MAKING HIGHLY ACTIVE METAL OXIDE AND METAL SULFIDE MATERIALS

FIELD OF THE INVENTION

This invention relates to a new method of making a catalyst or catalyst precursor. More particularly this invention relates to a novel method of making a mixed transition metal oxide and its use as a catalyst or catalyst precursor such as a hydrocarbon conversion catalyst or catalyst precursor or specifically a hydroprocessing catalyst or catalyst precursor. The hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

Currently there are two main drivers for refiners to invest in hydroprocessing technology. The first being environmental regulations imposing more stringent specifications on fuels including gasoline, diesel, and even fuel oils. For example, permitted sulfur and nitrogen levels in fuels are significantly lower than one decade ago. A second driving force is the quality of crude oils. More refineries are facing crude oils containing higher concentrations of sulfur and nitrogen compounds which are difficult to process or remove by conventional processes. Without new technology, refiners resort to increasing the severity of hydrotreating processes either by increasing the reactor temperatures or decreasing space velocity through the reactor. Increasing reactor temperature has the drawback of shortening catalyst lifetime. Decreasing space velocity, through increasing reactor size or decreasing feed flow rates, has the drawback of overhauling the reactors or significantly reducing production rates. Therefore, a highly active hydroprocessing catalyst is needed. A highly active hydroprocessing catalyst helps the refiners meet the stringent fuel sulfur and nitrogen limitations without significant investment in reactors and equipment and while maintaining production rates.

In the early 2000s, unsupported, also called "bulk", hydrotreating catalysts were applied in commercial hydrotreating processes. These catalysts were claimed to have several times more activity than conventional supported NiMo or CoMo hydrotreating catalysts based on the same loading volumes. However, to achieve the high activity, the unsupported hydrotreating catalysts often contained significantly more metal content than the conventional supported hydrotreating catalysts. Increased metal content means the cost of the catalyst is also increased. Thus, there is a need in the industry for an unsupported catalyst with better intrinsic activity per mass. An unsupported catalyst with higher intrinsic activity per mass will require less metal loading to achieve the same activity as the unsupported catalyst with less intrinsic activity at the same loading volumes.

U.S. Pat. No. 6,156,695 described a Ni—Mo—W mixed metal oxide material. The XRD pattern of this material was shown to be largely amorphous with only two crystalline peaks, the first at d=2.53 Angstroms and the second at d=1.70 Angstroms. U.S. Pat. No. 6,534,437 described a process for preparing a catalyst comprising bulk catalyst particles having at least one Group VIII non-noble metal and at least two Group VIB metals. The metal components were stated to be at least partly in the solid state during the material synthesis reaction with solubility of less than 0.05 mol/100 ml water at 18° C. U.S. Pat. No. 7,544,632 showed a bulk multi-metallic catalyst composition containing quaternary ammonium, $[CH_3(CH_2)_d N(CH_3)_3]$, where d is an integer from about 10 to about 40. U.S. Pat. No. 7,686,943 described a bulk metal catalyst comprising metal oxidic particles containing niobium as a Group V metal, a single Group VIB metal, and a single Group VIII metal. U.S. Pat. No. 7,776,205 described a bulk metal catalyst comprising a single Group VIB metal, a Group VB metal, and a Group VIII metal.

U.S. Pat. No. 8,173,570 showed co-precipitation to form at least a metal compound in solution selected from Group VIII, at least two Group VIB metal compounds in solution, and at least one organic oxygen containing chelating ligand in solution. The organic oxygen containing ligand has an LD50 rate larger than 700 mg/kg. U.S. Pat. No. 7,803,735 showed forming an unsupported catalyst precursor by co-precipitating at least one of a Group VIB metal compound, at least a metal compound selected from Group VIII, Group IIB, Group IIA, Group IVA, and combinations thereof, and at least one of an organic oxygen-containing ligand.

CN 101306374 described a catalyst of at least one Group VIII metal, at least two Group VIB metals and an organic additive. The organic additive is selected from organic ammonium compounds with the formula of $C_n H_{2n+1} N(Me)_3 X$ or $(C_n H_{2n+1})_4 NX$ where n=2-20 and X denotes Cl, Br, or OH. The XRD provided shows peaks at d=11.30+/−1.5 Angstroms, d=4.15+/−0.5 Angstroms, d=2.60+/−0.5 Angstroms, and d=1.53+/−0.5 Angstroms.

Unsupported NiZnMoW materials have been discussed in Applied Catalysis A: General 474 (2014) page 60-77. The material was synthesized in two steps. The first step prepared layered NiZn hydroxides. The second step prepared the NiZnMoW material via the reaction of layered NiZn hydroxide and solution containing $MoO_4^{2-}$ and $WO_4^{2-}$.

There is a need for new materials to meet increasing demands of conversion processes including the need for catalysts with higher intrinsic activity per mass. Further, there is a need to synthesize these catalysts in a manufacturing-friendly way. There is a need to produce the catalysts and catalyst precursors without the use of ammonia, without dependence on stirring or mixing, and without the added step pf adjusting pH during synthesis.

SUMMARY

An embodiment involves method of making a mixed transition metal oxide material comprising $M_I$, $M_{II}$, $M_{III}$, and $M_{IV}$, where: $M_I$ is optional and if present is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; the method comprising: adding sources of $M_{II}$, $M_{III}$, $M_{IV}$, and optionally $M_I$, to a quaternary ammonium hydroxide such as tetramethyl ammonium hydroxide to form a slurry; reacting the slurry at a temperature from about 25° C. to about 200° C. for a period of time from about 30 minutes to 200 hours to generate the mixed transition metal oxide material; and recovering the mixed transition metal oxide material. The mixed transition metal oxide material may be sulfided to generate metal sulfides. The metal sulfides may be used as an active catalyst in a conversion process.

In one embodiment the novel mixed transition metal oxide material has the formula:

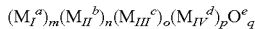

where: $M_I$ is optional and if present is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; a, b, c, d, and e, are the valence state of $M_I$, $M_{II}$, $M_{III}$, $M_{IV}$, and O; m, n, o, p, and q, are the mole ratio of $M_I$, $M_{II}$, $M_{III}$, $M_{IV}$, and O, wherein m/(m+n)≥0 and m/(m+n)≤1, wherein (m+n)/(o+p) is from 1/10 to 10/1, wherein o/p>0, and 0≤p/o≤100, wherein q is greater than 0, and a, b, c, d, e, m, n, o, p, and q satisfy the equation:

$$a*m+b*n+c*o+d*p+e*q=0$$

the material may be further characterized by an x-ray diffraction pattern comprising the peaks in Table A:

TABLE A

| 2θ (°) | d (Å) | 100(I/I$_o$) |
|---|---|---|
| 8-14 | 6.320-11.043 | vw |
| 34.5-36.5 | 2.460-2.598 | vs |
| 53-55 | 1.668-1.726 | s-vs |
| 55-58 | 1.589-1.668 | w-m |
| 58.5-62.5 | 1.485-1.576 | vw |
| 62.8-63.8 | 1.458-1.478 | m | wherein the peak at 2θ(°) of 55-58 has a full width at half maximum larger than 3°.

The conversion process may be a hydrocarbon conversion process. The conversion process may be hydroprocessing. The conversion process may be hydrodenitrification, hydrodesulfurization, hydrodemetallation, hydrodesilication, hydrodearomatization, hydroisomerization, hydrotreating, hydrofining, or hydrocracking. The mixed transition metal oxide material may be present in a mixture with at least one binder and wherein the mixture comprises up to about 80 wt % binder.

Additional features and advantages of the invention will be apparent from the description of the invention and claims provided herein.

DETAILED DESCRIPTION OF THE INVENTION

Figure 1:
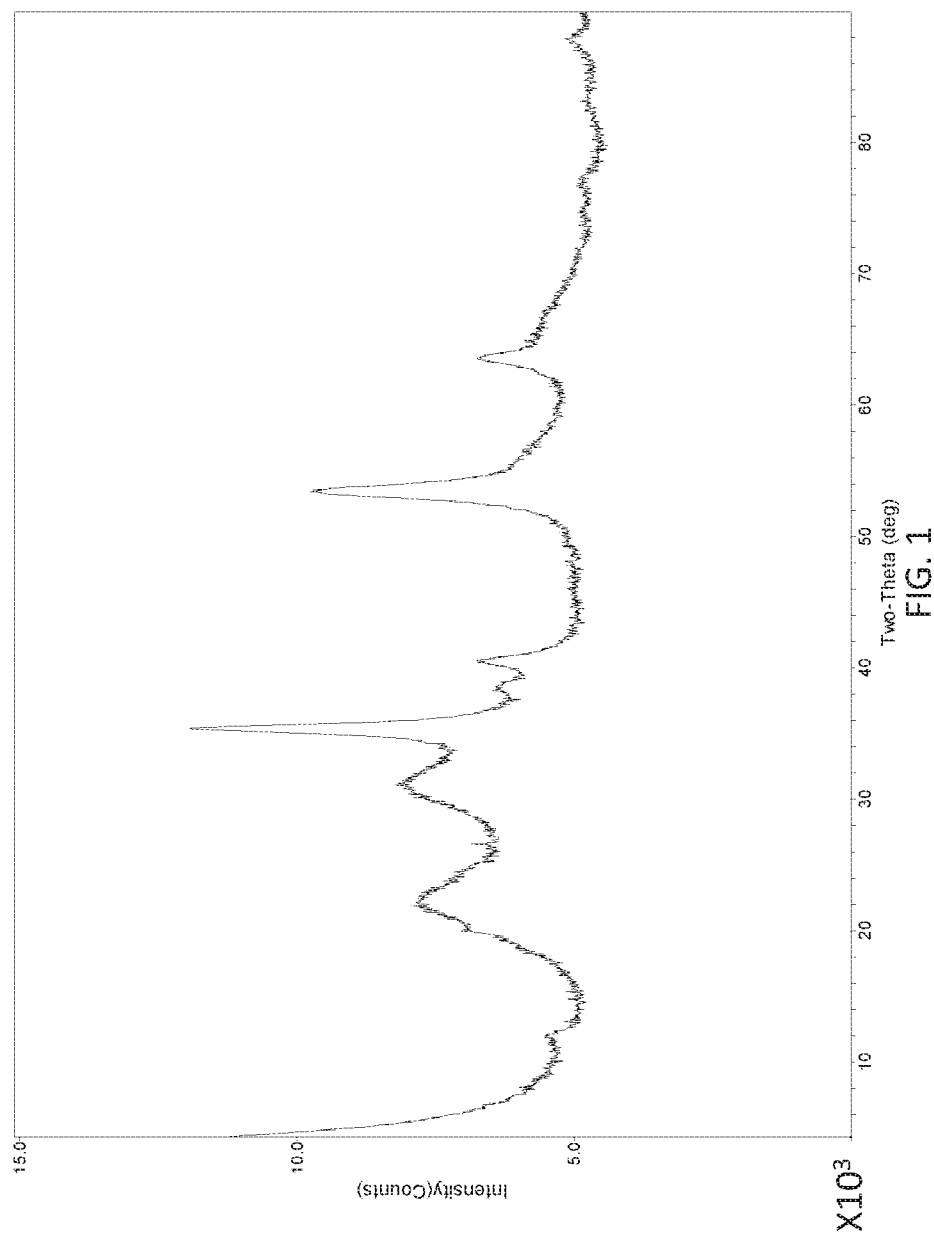
FIG. 1 is the X-ray diffraction pattern of a transition metal oxide material as described herein and prepared as in Examples 1 to 4.
Figure 2:
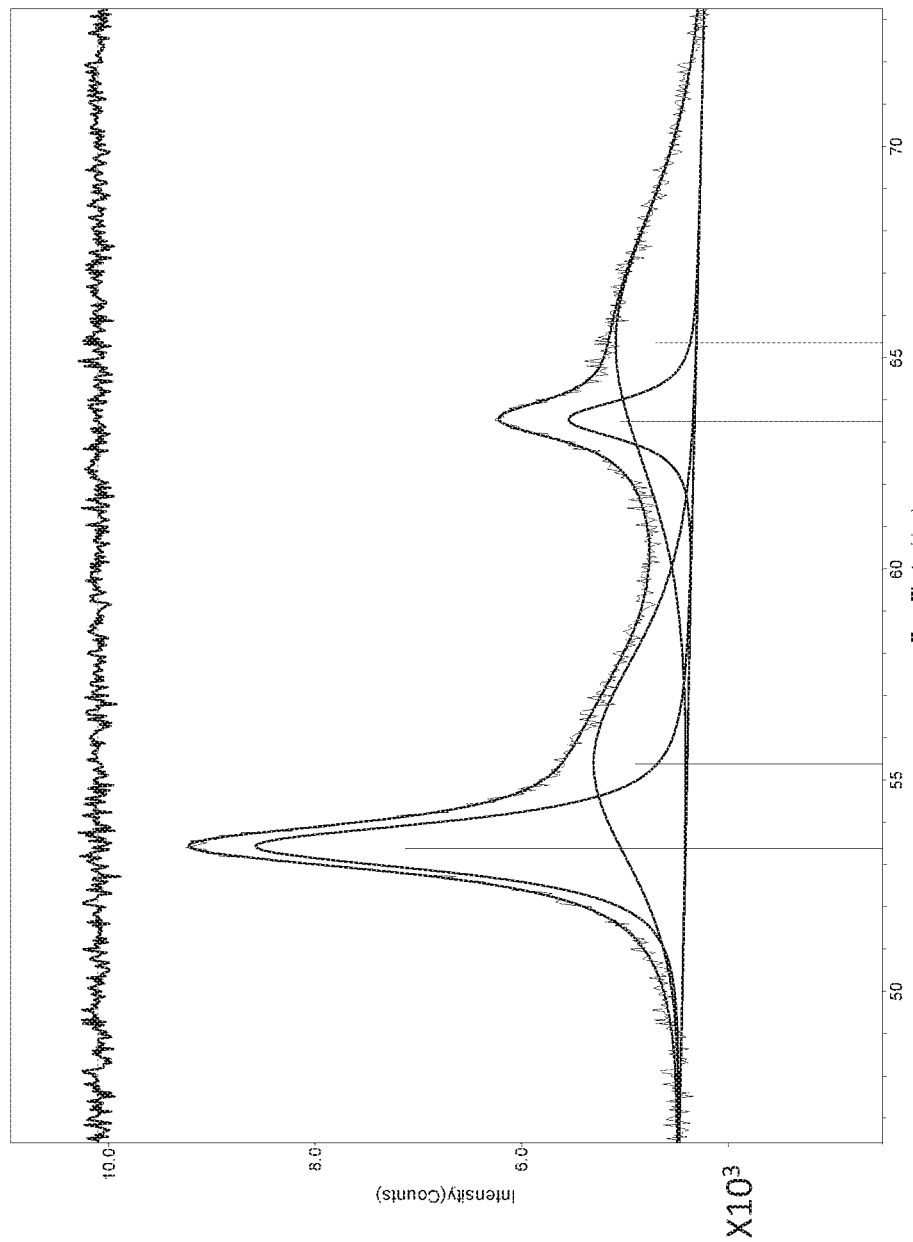
FIG. 2 is a portion of the X-ray diffraction pattern of FIG. 1 further showing peak deconvolution between 2θ(°) of 45-75°.

The present invention relates to a method of making mixed transition metal oxide materials. The mixed transition metal oxide may comprise $M_I$, $M_{II}$, $M_{III}$, and $M_{IV}$, where $M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); and $M_{IV}$ is a metal selected from Group VIB (IUPAC Group 6) which is different from $M_{III}$.

In one embodiment the metal oxide material has an empirical formula:

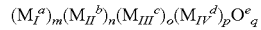

where: $M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from MIll; a, b, c, d, and e, are the valence state of $M_I$, $M_{II}$, $M_{III}$, $M_{IV}$, and O; m, n, o, p, and q, are the mole ratio of $M_I$, $M_{II}$, $M_{III}$, $M_{IV}$, and O, wherein m/(m+n)≥0 and m/(m+n)≤1, wherein (m+n)/(o+p) is from 1/10 to 10/1, wherein o/p>0, and 0≤p/o≤100, wherein q is greater than 0, and a, b, c, d, e, m, n, o, p, and q satisfy the equation:

$$a*m+b*n+c*o+d*p+e*q=0$$

the material may be further characterized by an x-ray diffraction pattern comprising the peaks in Table A:

TABLE A

| 2θ (°) | d (Å) | 100(I/I$_o$) |
|---|---|---|
| 8-14 | 6.320-11.043 | vw |
| 34.5-36.5 | 2.460-2.598 | vs |
| 53-55 | 1.668-1.726 | s-vs |
| 55-58 | 1.589-1.668 | w-m |
| 58.5-62.5 | 1.485-1.576 | vw |
| 62.8-63.8 | 1.458-1.478 | m | wherein the peak at 2θ(°) of 55-58 has a full width at half maximum larger than 3°. $M_I$ is optional and need not be present. When $M_I$ is not present, "m" of the formula is zero. If present, $M_I$ is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4), in one embodiment, $M_I$ may be selected from Al, Si, Zr, Mn, Cu, Zn, and any mixture thereof. Although $M_{II}$ is a metal or a mixture of metals selected from Group VIII (IUPAC Groups 8, 9, and 10), in one embodiment $M_{II}$ may be selected from Fe, Co, Ni, and any mixture thereof. Although $M_{III}$ is a metal selected from Group VIB (IUPAC Group 6) in one embodiment, $M_{III}$ is selected from Cr, Mo, and W. Although $M_{IV}$ is a metal selected from Group VIB (IUPAC Group 6) which is different from $M_{III}$, in one embodiment $M_{IV}$ is selected from Cr, Mo, and W so long as $M_{IV}$ is different from $M_{III}$.

Patterns presented herein were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. The intensity of each peak was determined by the peak height after subtracting background. To prevent errors in peak deconvolution, the background is taken to be linear in the range delimiting the broad diffraction features, 6-2 Å. To is the intensity of the peak at 2θ of 34.5-36.5°. $I/I_o$ is the ratio of the intensity of a peak to $I_o$. In terms of $100(I/I_o)$, the above designations are defined as: vw=0-5, w=5-20, m=20-60, s=60-80, and vs=80-100. It is known to those skilled in the art, the noise/signal ratio in XRD depends on scan conditions. Sufficient scan time is required to minimize noise/signal ratio to measure peak intensities.

The novel mixed transition metal oxide material can be prepared by co-precipitation by adding sources of the transition metals to a quaternary ammonium hydroxide such as tetramethyl ammonium hydroxide (TMAOH) to form a slurry. A combination of more than one quaternary ammonium hydroxides may be used. Tetramethylammonium hydroxide (TMAOH) is an exemplary quaternary ammonium hydroxide to form the slurry. Other quaternary ammonium hydroxides such as tetraethylammonium hydroxide (TEAOH), tetrapropylammonium hydroxide (TPAOH), tetrabutylammonium hydroxide (TBAOH) and any combination thereof may be used. No additional $NH_3 \cdot H_2O$ or other basic solutions are necessary, and the slurry need not contain $NH_3 \cdot H_2O$ or other basic solutions. The slurry is then reacted at a temperature from about 25° C. to about 200° C. for a period of time from about 30 minutes to 200 hours to generate the mixed transition metal oxide material. The mixed transition metal oxide material may be considered a catalyst precursor which then may undergo sulfidation to form metal sulfides. Optionally, short chain alkyl quaternary ammonium halide compounds may be added to the quaternary ammonium hydroxide or to the slurry. The term "metal" as used herein is meant to refer to the element and not meant to necessarily indicate a metallic form.

The quaternary ammonium hydroxide compound may be a short-chain alkyl quaternary ammonium hydroxide compound selected from compounds having the formula [R1 R2 R3 R4-N]OH, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. Specific examples of short-chain alkyl quaternary ammonium hydroxide compounds include, but are not limited to, tetra methyl ammonium hydroxide, tetra ethyl ammonium hydroxide, tetra propyl ammonium hydroxide, tetra butyl ammonium hydroxide, tetra pentyl ammonium hydroxide, tri-butyl methyl ammonium hydroxide, tri-propyl methyl ammonium hydroxide, tri-ethyl methyl ammonium hydroxide, di-propyl di-methyl ammonium hydroxide, butyl tri-methyl ammonium hydroxide, and any mixture thereof.

Sources of $M_I$, if $M_I$ is present, include, but are not limited to, the respective halide, sulfide, acetate, nitrate, carbonate, sulfate, oxalate, thiols, hydroxide salts, and oxides of $M_I$. Specific examples of sources of $M_I$ include, but are not limited to, manganese nitrate, manganese chloride, manganese bromide, manganese sulfate, manganese carbonate, manganese sulfide, manganese hydroxide, manganese oxide, zirconium nitrate, zirconium oxychloride, zirconium bromide, zirconium sulfate, zirconium basic carbonate, zirconium hydroxide, zirconium oxide, copper nitrate, copper chloride, copper bromide, copper sulfate, copper carbonate, copper acetate, copper oxalate, copper sulfide, copper hydroxide, copper oxide, zinc nitrate, zinc chloride, iron bromide, zinc sulfate, zinc carbonate, zinc acetate, zinc oxalate, zinc sulfide, zinc hydroxide, zinc oxide, and any mixture thereof.

Sources of $M_{II}$ include, but are not limited to, the respective halide, sulfide, acetate, nitrate, carbonate, sulfate, oxalate, thiols, hydroxide salts, and oxides of $M_{II}$. Specific examples of sources of $M_{II}$ include, but are not limited to, nickel chloride, nickel bromide, nickel nitrate, nickel acetate, nickel carbonate, nickel hydroxide, cobalt chloride, cobalt bromide, cobalt nitrate, cobalt acetate, cobalt carbonate, cobalt hydroxide, cobalt sulfide, nickel chloride, cobalt oxide, nickel bromide, nickel nitrate, nickel acetate, nickel carbonate, nickel hydroxide, nickel sulfide, nickel oxide, iron acetate, iron oxalate, iron nitrate, iron chloride, iron bromide, iron sulfate, iron carbonate, iron acetate, iron oxalate, iron sulfide, iron oxide, and any mixture thereof.

Sources of Mill include, but are not limited to, the respective oxides of $M_{III}$, sulfides of $M_{III}$, halides of $M_{III}$, molybdates, tungstates, thiolmolybdates, and thioltungstates. Specific examples of sources of $M_{III}$ include, but are not limited to, molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium metatungstate, sodium paratungstate, and any mixture thereof.

Sources of $M_{IV}$ include, but are not limited to, the respective oxides of $M_{IV}$, sulfides of $M_{IV}$, halides of $M_{IV}$, molybdates, tungstates, thiolmolybdates, and thioltungstates. Specific examples of sources of $M_{IV}$ include, but are not limited to, molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium metatungstate, sodium paratungstate, and any mixtures thereof.

While tetramethylammonium hydroxide (TMAOH) is an exemplary quaternary ammonium hydroxide to form the slurry, other quaternary ammonium hydroxides such as tetraethylammonium hydroxide (TEAOH), tetrapropylammonium hydroxide (TPAOH), tetrabutylammonium hydroxide (TBAOH) and any combination thereof may be used.

Optionally, a short-chain alkyl quaternary ammonium halide compound, may be added to the quaternary ammonium hydroxide such as TMAOH or to the resulting slurry. If employed, the short-chain alkyl quaternary ammonium halide compound may be selected from compounds having the formula [R1 R2 R3 R4-N]X, where R1, R2, R3 and R4 are alkyl groups having from 1 to 6 carbon atoms such as methyl, ethyl, propyl, butyl, pentyl, and hexyl, and R1, R2, R3 and R4 can be the same or different from each other. In a specific embodiment, X is selected from F, Cl, Br, and I. Specific examples of short-chain alkyl quaternary ammonium halide compounds include, but are not limited to, tetra methyl ammonium chloride, tetra methyl ammonium bromide, tetra ethyl ammonium chloride, tetra ethyl ammonium bromide, tetra propyl ammonium chloride, tetra propyl ammonium bromide, tetra butyl ammonium chloride, tetra butyl ammonium bromide, tetra pentyl ammonium chloride, tetra pentyl ammonium bromide, tri-butyl methyl ammonia chloride, tri-butyl methyl ammonium bromide, tri-propyl methyl ammonium chloride, tri-propyl methyl ammonium bromide, tri-ethyl methyl ammonium chloride, tri-ethyl methyl ammonium bromide, di-propyl di-methyl ammonium chloride, di-propyl di-methyl ammonium bromide, butyl tri-methyl ammonium chloride, butyl tri-methyl ammonium bromide, and any mixture thereof.

Although different mixed metal oxides may be prepared, in one embodiment the mixed metal oxide material has an empirical formula:

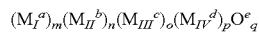

$$(M_I^a)_m(M_{II}^b)_n(M_{III}^c)_o(M_{IV}^d)_p O^e_q$$

where: $M_I$ is optional and if present is a metal or mixture of metals selected from Group IB (IUPAC Group 11), Group IIB (IUPAC Group 12), Group VIM (IUPAC Group 7), Group IIIA (IUPAC Group 13), Group IVA (IUPAC Group 14), and Group IVB (IUPAC Group 4); $M_{II}$ is a metal or a mixture of metals selected from Group VIII (IUPAC Groups 8, 9, and 10); $M_{III}$ is a metal selected from Group VIB (IUPAC Group 6); $M_{IV}$ is a metal selected from Group VIB (IUPAC Group 6) which is different from $M_{III}$; a, b, c, d, and e, are the valence state of $M_I$, $M_{II}$, $M_{III}$, $M_{IV}$, and O; m, n, o, p, and q, are the mole ratio of $M_I$, $M_{II}$, $M_{III}$, $M_{IV}$, and O, wherein m/(m+n)≥0 and m/(m+n)≤1, wherein (m+n)/(o+p) is from 1/10 to 10/1, wherein o/p>0, and 0≤p/o≤100, wherein q is greater than 0, and a, b, c, d, e, m, n, o, p, and q satisfy the equation:

$$a*m+b*n+c*o+d*p+e*q=0$$

In this embodiment, the metal oxide material synthesized by the method of the invention has features characterized by X-ray powder diffraction (XRD) pattern. The material may be characterized by an x-ray diffraction pattern comprising the peaks in Table A:

TABLE A

| 2θ (°) | d (Å) | 100(I/I$_o$) |
|---|---|---|
| 8-14 | 6.320-11.043 | vw |
| 34.5-36.5 | 2.460-2.598 | vs |
| 53-55 | 1.668-1.726 | s-vs |
| 55-58 | 1.589-1.668 | w-m |
| 58.5-62.5 | 1.485-1.576 | vw |
| 62.8-63.8 | 1.458-1.478 | m | wherein the peak at 2θ(°) of 55-58 has a full width at half maximum larger than 3°. Additional peaks may comprise 2θ(°) 18-21, d (Å) of 4.227-4.924, with 100(I/I$_o$) of vw to w; 2θ(°) 21-23, d (Å) of 3.864-4.227, with 100(I/I$_o$) of m to s; 2θ(°) 30-32, d (Å) of 2.795-2.976, with 100(I/I$_o$) of m to s. In one embodiment, the XRD pattern of the material comprises a peak between 2θ of 21° and 23°; a peak between 2θ of 34.5° and 36.5°; a peak between 2θ of 53° and 55°; a peak between 2θ of 55° and 58° with the full width at half maximum (FWHM) larger than 3°; and a peak between 2θ of 62.8° and 63.8°.

The method of this invention provides that the mixed transition metal oxides may be prepared though co-precipitation by adding sources of the transition metals to one or more quaternary ammonium hydroxides such as TMAOH to form a slurry. Optionally at least one short-chain alkyl quaternary ammonium halide compound may be added to the one or more quaternary ammonium hydroxides such as TMAOH or to the resulting slurry. The slurry may further include protic solvents such as water and alcohols with exemplary alcohols including ethanol, isopropanol, butanol, and glycol. The slurry may be formed by adding the sources of the transition metals to the one or more quaternary ammonium hydroxides such as TMAOH in any order or in any combination. In one embodiment, the sources of $M_I$, $M_{II}$, $M_{III}$, and $M_{IV}$ may be in one or more solutions prior to adding to the one or more quaternary ammonium hydroxides such as TMAOH to form the slurry. With this method, it is not necessary to adjust the pH of the slurry. Elimination of the need for pH adjustment simplifies manufacturing operations and eliminates the need for additional base materials such as NH$_4$OH, amines, and the like, or mineral acids such as nitric acid, hydrochloric acid, sulfuric acid, hydrofluoric acid, or an organic acid such as citric acid or malic acid. Particularly advantageous is the elimination of ammonia which is corrosive with a very pungent odor.

The slurry is reacted at a temperature in the range of about 25° C. to about 200° C., or from about 60° C. to about 180° C., or from about 80° C. to about 150° C. in a sealed autoclave reactor or in a reactor open to ambient pressure. The sealed autoclave reactor or the reactor open to ambient pressure can be optionally equipped with a stirring device to mix the slurry. In another embodiment, the sealed autoclave or the reactor open to the ambient pressure does not have a stirring device and the reaction is conducted at a static state unless the temperature of the reaction mixture slurry is higher than boiling point of the slurry, causing autonomous stirring by the boiling of the reaction mixture slurry. The success of the reaction is not tied to the stirring. In embodiment where a reactor open to ambient pressure is employed, a reflux device can be optionally attached to the reactor to avoid solvent loss when the reaction temperature is close to or above the boiling temperature of the reaction mixture slurry.

The reaction time may range from about 0.5 to about 200 h, or 0.5 h to about 100 h, or from about 1 h to about 50 h, or from about 2 h to about 24 h. Although not necessary, the slurry may be mixed continuously or intermittently during the reaction. In one embodiment, the slurry is mixed every few hours. The mixed transition metal oxide material is recovered from the slurry. The mixed transition metal oxide material may be considered a catalyst precursor. Sulfidation of the mixed transition metal oxide may be employed to generate metal sulfides which in turn are used as catalysts.

In a specific embodiment, the mixed transition metal oxide material or the metal sulfides generated therefrom may be present in a composition along with a binder, where the binder may be, for example, silicas, aluminas, silica-aluminas, titanias, zirconias, natural clays, synthetic clays, and mixtures thereof. The selection of binder includes but is not limited to, anionic and cationic clays such as hydrotalcites, pyroaurite-sjogrenite-hydrotalcites, montmorillonite and related clays, kaolin, sepiolites, silicas, aluminas such as (pseudo) boehomite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk mixed transition metal oxide material, or may be incorporated during synthesis. The amount of binder may range from about 1 to about 80 wt % of the finished composition, or from about 1 to about 30 wt % of the finished composition, or from about 5 to about 26 wt % of the finished composition. The binder may be chemically bound to the mixed transition metal oxide material or metal sulfides, or the binder may be present in a physical mixture with the novel mixed transition metal oxide material or resulting metal sulfides. The mixed transition metal oxide material or metal sulfides may be extruded or pelletized with or without a binder.

At least a portion of the mixed transition metal oxide material, with or without a binder, or before or after inclusion of a binder, can be sulfided in situ in an application or pre-sulfided to form metal sulfides which in turn are used as catalysts in an application. The sulfidation may be conducted under a variety of sulfidation conditions such as through contact of the mixed transition metal oxide material with a sulfur containing stream or feedstream as well as the use of a gaseous mixture of $H_2S/H_2$. The sulfidation of the mixed transition metal oxide material is performed at elevated temperatures, typically ranging from 50 to 600° C., or from 150 to 500° C., or from 250 to 450° C. The sulfiding step can take place at a location remote from other synthesis steps, remote from the location of the application where the mixed transition metal oxide material will be used, or remote from both the location of synthesis and remote from location of use. The materials resulting from the sulfiding step are referred to as metal sulfides which can be used as catalysts in conversion processes.

As discussed, at least a portion of the mixed transition metal oxide material of this invention can be sulfided and the resulting metal sulfides used as catalysts in conversion processes such as hydrocarbon conversion processes. Hydroprocessing is one class of hydrocarbon conversion processes in which the mixed transition metal oxide material is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment a conversion process comprises contacting the mixed transition metal oxide material with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Contact time for the feed and the active catalyst, referred to as liquid hourly space velocities (LHSV), should be in the range of about 0.1 h$^{-1}$ to about 10 or about 0.25 to about 8.0 Specific subsets of these ranges may be employed depending upon the feedstock being used. For example, when hydrotreating a typical diesel feedstock, operating conditions may include from about 3.5 MPa to about 8.6 MPa, from about 315° C. to about 410° C., from about 0.25 to about 5 and from about 84 Nm$^3$ H$_2$/m$^3$ to about 850 Nm$^3$ H$_2$/m$^3$ feed. Other feedstocks may include gasoline, naphtha, kerosene, gas oils, distillates, and reformate.

Examples are provided below to describe the invention more completely. These examples are only by way of illustration and should not be interpreted as a limitation of the broad scope of the invention, which is set forth in the claims.

Example 1

16.01 g of TMAOH was set to stir in a beaker. 0.86 g of zinc acetate dissolved in 5 g deionized water was added to the TMAOH followed by the addition of a solution containing 1.62 g of ammonium heptamolybdate, 2.93 g of ammonium metatungstate, 4.54 g nickel nitrate, and 49 g deionized water. The resulting slurry was stirred and transferred to a 45 ml Parr reactor. The slurry was then digested at 150° C. for 17 hours in a tumbled oven. After the completion of the synthesis, the precipitated mixed transition metal oxide was recovered and washed by centrifugation. Then the mixed transition metal oxide was dried in air and sulfided in a $H_2S/H_2$ atmosphere to form metal sulfides. The metal sulfides were tested as a catalyst for conversion of 2-methyl naphthalene in $H_2$ to hydrogenated products and showed 74 wt. % conversion at 300° C. The mixed transition metal oxide, before sulfidation, was analyzed by x-ray powder diffraction and found to have an x-ray diffraction pattern comprising the peaks in Table A.

Example 2

16.01 g of TMAOH was set to stir in a beaker. 0.86 g of zinc acetate dissolved in 5 g deionized water was added to the TMAOH followed by the addition of a solution containing 1.62 g of ammonium heptamolybdate, 2.93 g of ammonium metatungstate, 4.54 g nickel nitrate, and 49 g deionized water. The resulting slurry was stirred and transferred to a 45 ml Parr reactor. The slurry was then digested at 100° C. for 18.5 hours in a static oven. After the completion of the synthesis, the precipitated mixed transition metal oxide was recovered and washed by centrifugation. Then the mixed transition metal oxide was dried in air and sulfided in a $H_2S/H_2$ atmosphere to form metal sulfides. The metal sulfides were tested as a catalyst for conversion of 2-methyl naphthalene in $H_2$ to hydrogenated products and showed 79 wt. % conversion at 300° C. The mixed transition metal oxide, before sulfidation, was analyzed by by x-ray powder diffraction and found to have an x-ray diffraction pattern comprising the peaks in Table A.

Example 3

16.01 g of TMAOH was set to stir in a beaker. 0.86 g of zinc acetate and 3.92 g nickel nitrate dissolved in 34.49 g deionized water was added to the TMAOH followed by the addition of a solution containing 1.63 g of ammonium heptamolybdate, 2.96 g of ammonium metatungstate, and 20 g deionized water. The resulting slurry was stirred and transferred to a 45 ml Parr reactor. The slurry was then digested at 175° C. for 17 hours in a tumbled oven. After the completion of the synthesis, the precipitated mixed transition metal oxide was recovered and washed by centrifugation. Then the mixed transition metal oxide was dried in air and sulfided in a $H_2S/H_2$ atmosphere to form metal sulfides. The metal sulfides were tested as a catalyst for conversion of 2-methyl naphthalene in $H_2$ to hydrogenated products and showed 77 wt. % conversion at 300° C. The mixed transition metal oxide, before sulfidation, was analyzed by by x-ray powder diffraction and found to have an x-ray diffraction pattern comprising the peaks in Table A.

Example 4

16.01 g of TMAOH was set to stir in a beaker. 0.86 g of zinc acetate and 3.92 g nickel nitrate dissolved in 34.49 g deionized water was added to the TMAOH followed by the addition of a solution containing 1.63 g of ammonium heptamolybdate, 2.96 g of ammonium metatungstate, and 20 g deionized water. The resulting slurry was stirred and transferred to a 45 ml Parr reactor. The slurry was then digested at 100° C. for 18.5 hours in a tumbled oven After the completion of the synthesis, the precipitated mixed transition metal oxide was recovered and washed by centrifugation. Then the mixed transition metal oxide was dried in air and sulfided in a $H_2S/H_2$ atmosphere to form metal sulfides. The metal sulfides were tested as a catalyst for conversion of 2-methyl naphthalene in $H_2$ to hydrogenated products and showed 74 wt. % conversion at 300° C. The mixed transition metal oxide, before sulfidation, was analyzed by by x-ray powder diffraction and found to have an x-ray diffraction pattern comprising the peaks in Table A.

Embodiments

While the following is described in conjunction with specific embodiments, it will be understood that this description is intended to illustrate and not limit the scope of the preceding description and the appended claims.

A first embodiment is a method of making a mixed transition metal oxide material comprising $M_I$, $M_{II}$, $M_{III}$, and $M_{IV}$, where:

$M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4);

$M_{II}$ is a metal or a mixture of metals selected from Group VIII (IUPAC Groups 8, 9, and 10);

$M_{III}$ is a metal selected from Group VIB (IUPAC Group 6);

$M_{IV}$ is a metal selected from Group VIB (IUPAC Group 6) which is different from $M_{III}$;

the method comprising:
(a) adding sources of $M_{II}$, $M_{III}$, $M_{IV}$, and optionally $M_I$, to at least one quaternary ammonium hydroxide to form a slurry;
(b) reacting the slurry at a temperature from about 25° C. to about 200° C. for a period from about 30 minutes to 200 hours to generate the mixed transition metal oxide material; and
(c) recovering the mixed transition metal oxide material.

The first embodiment wherein the mixed transition metal oxide material has the formula:

$$(M_I^a)_m(M_{II}^b)_n(M_{III}^c)_o(M_{IV}^d)_p O^e_q$$

where:
$M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4);
$M_{II}$ is a metal or a mixture of metals selected from Group VIII (IUPAC Groups 8, 9, and 10);
$M_{III}$ is a metal selected from Group VIB (IUPAC Group 6);
$M_{IV}$ is a metal selected from Group VIB (IUPAC Group 6) which is different from $M_{III}$;
a, b, c, d, and e are the valence state of $M_I$, $M_{II}$, $M_{III}$, $M_{IV}$, and O;
m, n, o, p, and q are the mole ratio of $M_I$, $M_{II}$, $M_{III}$, $M_{IV}$, and O, wherein $m/(m+n) \geq 0$ and $m/(m+n) \leq 1$, wherein $(m+n)/(o+p)$ is from 1/10 to 10/1, wherein $o/p>0$, and $0 \leq p/o \leq 100$, wherein q is greater than 0, and a, b, c, d, e, m, n, o, p, and q satisfy the equation:

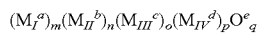

$$a*m+b*n+c*o+d*p+e*q=0$$

the material further characterized by an x-ray diffraction pattern comprising the peaks in Table A:

TABLE A

| 2θ (°) | d (Å) | 100(I/I$_o$) |
|---|---|---|
| 8-14 | 6.320-11.043 | vw |
| 34.5-36.5 | 2.460-2.598 | vs |
| 53-55 | 1.668-1.726 | s-vs |
| 55-58 | 1.589-1.668 | w-m |
| 58.5-62.5 | 1.485-1.576 | vw |
| 62.8-63.8 | 1.458-1.478 | m | wherein the peak at 2θ(°) of 55-58 has a full width at half maximum larger than 3°.

The first embodiment wherein $M_I$, if present, is Si, Zr, Mn, Cu, Zn, or any mixture thereof. The first embodiment wherein $M_{II}$ is Fe, Co, Ni, or any mixture thereof. The first embodiment wherein $M_{III}$ is Cr, Mo, or W. The first embodiment wherein $M_{IV}$ is Cr, Mo, or W and is different from $M_{III}$. The first embodiment further comprising sulfiding at least a portion of the recovered mixed transition metal oxide material to form metal sulfides. The first embodiment wherein the quaternary ammonium hydroxide is selected from tetramethylammonium hydroxide (TMAOH), tetraethylammonium hydroxide (TEAOH), tetrapropylammonium hydroxide (TPAOH), tetrabutylammonium hydroxide (TBAOH) and any combination thereof. The first embodiment further comprising adding a binder to the reaction mixture or to the recovered mixed transition metal oxide material wherein the binder is selected from aluminas, silicas, alumina-silicas, titanias, zirconias, natural clays, synthetic clays, and mixtures thereof. The first embodiment wherein the reacting is conducted under atmospheric pressure or autogenous pressure. The first embodiment further comprising mixing the slurry. The first embodiment wherein the temperature is varied during the reacting. The first embodiment further comprising adding, to the at least one quaternary ammonium hydroxide or to the slurry, at least one short-chain alkyl quaternary ammonium halide compound having the formula [R1 R2 R3 R4-N]X, where R1, R2, R3 and R4 are alkyl groups having 1 to 6 carbon atoms, and R1, R2, R3 and R4 can be the same or different.

A second embodiment of method of making metal sulfides from a mixed transition metal oxide material comprising $M_I$, $M_{II}$, $M_{III}$, and $M_{IV}$, where:
$M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4);
$M_{II}$ is a metal or a mixture of metals selected from Group VIII (IUPAC Groups 8, 9, and 10);
$M_{III}$ is a metal selected from Group VIB (IUPAC Group 6);
$M_{IV}$ is a metal selected from Group VIB (IUPAC Group 6) which is different from $M_{III}$;

the method comprising:
(d) adding sources of $M_{II}$, $M_{III}$, $M_{IV}$, and optionally $M_I$, to at least one quaternary ammonium hydroxide to form a slurry;
(e) reacting the slurry at a temperature from about 25° C. to about 200° C. for a period of time from about 30 minutes to 200 hours to generate the mixed transition metal oxide material;
(f) recovering the mixed transition metal oxide material; and (g) sulfiding at least a portion of the mixed transition metal oxide material to form metal sulfides.

The second embodiment wherein $M_I$, when present, is Si, Zr, Mn, Cu, Zn, or any mixture thereof; $M_{II}$ is Fe, Co, Ni, or any mixture thereof; $M_{III}$ is Cr, Mo, or W; and $M_{IV}$ is Cr, Mo, or W and is different from $M_{III}$. The second embodiment wherein the quaternary ammonium hydroxide is tetramethylammonium hydroxide (TMAOH), or tetraethylammonium hydroxide (TEAOH), tetrapropylammonium hydroxide (TPAOH), tetrabutylammonium hydroxide (TBAOH) and any mixtures thereof. The second embodiment further comprising adding a binder to the reaction mixture or to the recovered mixed transition metal oxide material wherein the binder is selected from aluminas, silicas, alumina-silicas, titanias, zirconias, natural clays, synthetic clays, and mixtures thereof. The second embodiment further comprising mixing the slurry. The second embodiment wherein the temperature is varied during the reacting. The second embodiment further comprising adding, to the at least one quaternary ammonium hydroxide or to the slurry, at least one short-chain alkyl quaternary ammonium halide compound having the formula [R1 R2 R3 R4-N]X, where R1, R2, R3 and R4 are alkyl groups having 1 to 6 carbon atoms, and R1, R2, R3 and R4 can be the same or different.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

The invention claimed is:

1. A method of making a mixed transition metal oxide material comprising $M_I$, $M_{II}$, $M_{III}$, and $M_{IV}$, where:
   $M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4);
   $M_{II}$ is a metal or a mixture of metals selected from Group VIII (IUPAC Groups 8, 9, and 10);
   $M_{III}$ is a metal selected from Group VIB (IUPAC Group 6);
   $M_{IV}$ is a metal selected from Group VIB (IUPAC Group 6) which is different from $M_{III}$;
   the material further characterized by an x-ray diffraction pattern comprising the peaks in Table A:

TABLE A

| 2θ (°) | d (Å) | 100(I/I$_o$) |
|---|---|---|
| 8-14 | 6.320-11.043 | vw |
| 34.5-36.5 | 2.460-2.598 | vs |
| 53-55 | 1.668-1.726 | s-vs |
| 55-58 | 1.589-1.668 | w-m |
| 58.5-62.5 | 1.485-1.576 | vw |
| 62.8-63.8 | 1.458-1.478 | m | wherein the peak at 2θ (°) of 55-58 has a full width at half maximum larger than 3°;

the method comprising:
(a) adding sources of $M_{II}$, $M_{III}$, $M_{IV}$, and optionally $M_I$, to at least one quaternary ammonium hydroxide to form a slurry;
(b) reacting the slurry at a temperature from about 25° C. to about 200° C. for a period from about 30 minutes to 200 hours to generate the mixed transition metal oxide material; and
(c) recovering the mixed transition metal oxide material.

2. The method of claim 1 wherein the mixed transition metal oxide material has the formula:

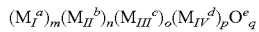

where:
$M_I$ is optional and if present is a metal or mixture of metals selected from Group IB (IUPAC Group 11), Group IIB (IUPAC Group 12), Group VIIB (IUPAC Group 7), Group IIIA (IUPAC Group 13), Group IVA (IUPAC Group 14), and Group IVB (IUPAC Group 4);
$M_{II}$ is a metal or a mixture of metals selected from Group VIII (IUPAC Groups 8, 9, and 10);
$M_{III}$ is a metal selected from Group VIB (IUPAC Group 6);
$M_{IV}$ is a metal selected from Group VIB (IUPAC Group 6) which is different from $M_{III}$;
a, b, c, d, and e are the valence state of $M_I$, $M_{II}$, $M_{III}$, $M_{IV}$, and O;
m, n, o, p, and q are the mole ratio of $M_I$, $M_{II}$, $M_{III}$, $M_{IV}$, and O, wherein m/(m+n)≥0 and m/(m+n)≤1, wherein (m+n)/(o+p) is from 1/10 to 10/1, wherein o/p>0, and 0≤p/o≤100, wherein q is greater than 0, and a, b, c, d, e, m, n, o, p, and q satisfy the equation:

$$a*m+b*n+c*o+d*p+e*q=0.$$

3. The method of claim 1 wherein $M_I$, if present, is Si, Zr, Mn, Cu, Zn, or any mixture thereof.

4. The method of claim 1 wherein $M_{II}$ is Fe, Co, Ni, or any mixture thereof.

5. The method of claim 1 wherein $M_{III}$ is Cr, Mo, or W.

6. The method of claim 1 wherein $M_{IV}$ is Cr, Mo, or W and is different from $M_{III}$.

7. The method of claim 1 further comprising sulfiding at least a portion of the recovered mixed transition metal oxide material to form metal sulfides.

8. The method of claim 1 wherein the quaternary ammonium hydroxide is selected from tetramethylammonium hydroxide (TMAOH), tetraethylammonium hydroxide (TEAOH), tetrapropylammonium hydroxide (TPAOH), tetrabutylammonium hydroxide (TBAOH) and any combination thereof.

9. The method of claim 1 further comprising adding a binder to the reaction mixture or to the recovered mixed transition metal oxide material wherein the binder is selected from aluminas, silicas, alumina-silicas, titanias, zirconias, natural clays, synthetic clays, and mixtures thereof.

10. The method of claim 1 wherein the reacting is conducted under atmospheric pressure or autogenous pressure.

11. The method of claim 1 further comprising mixing the slurry.

12. The method of claim 1 wherein the temperature is varied during the reacting.

13. The method of claim 1 further comprising adding, to the at least one quaternary ammonium hydroxide or to the slurry, at least one short-chain alkyl quaternary ammonium halide compound having the formula [R1 R2 R3 R4-N]X, where R1, R2, R3 and R4 are alkyl groups having 1 to 6 carbon atoms, and R1, R2, R3 and R4 can be the same or different.

\* \* \* \* \*